May 28, 1929.  C. A. CAMPBELL  1,715,220
EMERGENCY VALVE
Filed July 26, 1927
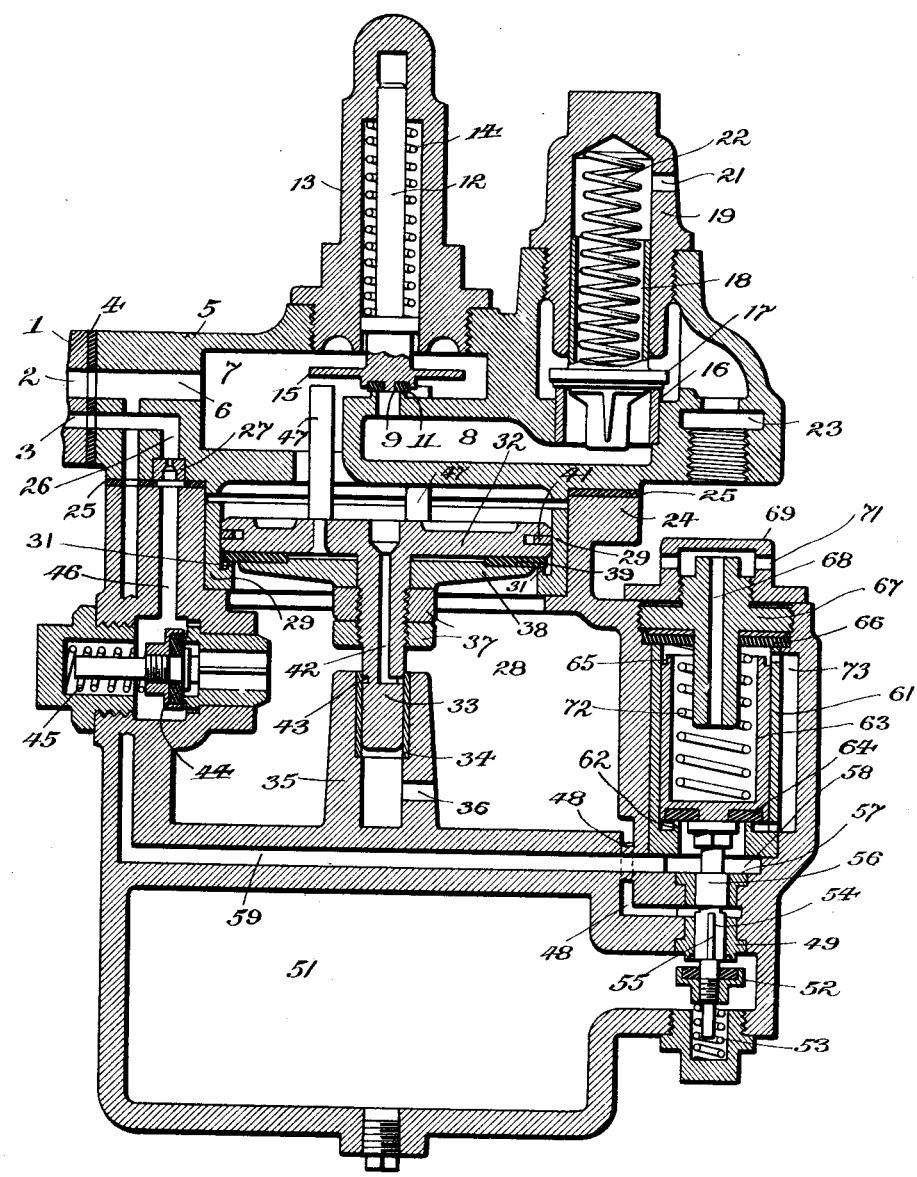
Inventor
Charles H. Campbell
By Dodge & Sons
Attorneys Patented May 28, 1929.

1,715,220

UNITED STATES PATENT OFFICE.

CHARLES A. CAMPBELL, OF WATERTOWN, NEW YORK, ASSIGNOR TO THE NEW YORK AIR BRAKE COMPANY, A CORPORATION OF NEW JERSEY.

EMERGENCY VALVE.

Application filed July 26, 1927. Serial No. 208,629.

This invention relates to fluid pressure brakes and particularly to what is known as a brake pipe vent valve. It is common practice to use with various types of triple valves a vent valve mechanism for venting the brake pipe in emergency, such venting being for the purpose of accelerating movement of the triple valve to emergency position and for accelerating the propagation of the reduced pressure wave throughout the length of the brake pipe.

A known type of vent valve involves a piston balanced between the opposing pressures of the brake pipe and a reservoir. This piston actuates a small valve which controls the flow of pressure fluid back and forth between the brake pipe and the reservoir. The piston has three positions. The charging position when brake pipe pressure predominates and in which the air flows from the brake pipe to the reservoir through a very restricted charging passage, a service position in which the piston has moved to engage, but not to open, the brake pipe vent valve. This position is assumed when brake pipe pressure is reduced slowly, i. e., at a service rate, and in service position the valve controlled by the piston vents the reservoir at a corresponding rate so that so long as the brake pipe pressure is reduced at a service rate, the piston remains in service position ready to move to emergency position. The third position of the piston is emergency position in which, as a result of the sharp reduction of brake pipe pressure, the piston moves to its limiting position and unseats the brake pipe vent valve. As a result of such reduction of brake pipe pressure and the ensuing local venting of the brake pipe, the reservoir vent port is inadequate to reduce reservoir pressure at a rate commensurate with the reduction of brake pipe pressure. Accordingly, the piston remains in emergency position for a substantial period. This period is determined by the capacity of the reservoir relatively to the reservoir vent port, and is such as to insure the propagation of the emergency pressure drop rapidly from car to car throughout the train.

The purpose of the present invention is to add to emergency vent valves of the above type, and also to automatic air brake valves generally, of that class in which a piston is balanced between brake pipe and reservoir pressure and moves under predominant reservoir pressure to a brake applying position, a new device which will insure an application if the pressure in the brake system is very slowly depleted and when the depleted pressure reaches a chosen low value. The necessity for this occurs particularly in cases where an angle cock becomes accidentally closed or the brake pipe is frozen. This prevents recharging of the pipe and leakage causes a slow reduction of brake pipe pressure, so slow in fact as not to cause a service application. The device forming the subject matter of the present application functions when brake pipe pressure reaches a chosen low value to produce automatically the emergency application of the brakes. The occurrence of this emergency application will bring the train to rest and require the train crew to remedy the abnormal condition which occasioned its occurrence.

In its broadest aspect, the device consists of a mechanism subject to brake pipe pressure and rendered effective by the depletion of brake pipe pressure to a chosen value to admit pressure to the reservoir at a pressure higher than the depleted pressure in the brake pipe, such admission insuring the movement of the valve mechanism to a brake applying position. In the case of the vent valve here illustrated, this brake applying position is a brake pipe venting position. Obviously if the brake pipe is vented to atmosphere the triple valves must function. In other embodiments of the inventive idea the application might be brought about more directly, but the way in which the application is produced is immaterial to the broader considerations involved.

A convenient way to supply the necessary air is to make use of a secondary reservoir which is charged when the other reservoir is charged, and to cause the pressure controlled valve to connect the two reservoirs when the automatic application is to be made. The simplest construction to accomplish this effect involves a check valve interposed between the two reservoirs and opening toward the secondary reservoir, and a spring urged plunger, which is normally held in inoperative position by brake pipe pressure and which upon depletion of brake pipe pressure is moved by its spring to unseat the check valve and permit back flow to occur from the supplemental reservoir to the then partially depleted reservoir of the vent valve structure.

A preferred embodiment of the invention is illustrated in the accompanying drawing, which shows the vent valve mechanism in vertical axial section.

In this drawing the brake pipe, triple valve, the auxiliary reservoir and the brake cylinder are not shown. The points of connection of the brake pipe and the auxiliary reservoir are indicated, and it will be understood that the brake pipe, triple valve, auxiliary reservoir and brake cylinder are connected with each other in the customary manner. The emergency vent valve is so connected that when it functions it reduces brake pipe pressure adjacent the piston of the triple valve and causes the triple valve to move to emergency position.

In the drawing, 1 represents a portion of the triple valve structure in which is formed a port 2 communicating directly with the brake pipe, and a port 3 communicating directly with the auxiliary reservoir. Connected to the casting 1, with an intervening gasket 4, is a casting 5 which serves as a support for and as an upper portion of the housing of the vent valve structure. The port 2 communicates with a port 6 which leads to a chamber 7 into which projects a member provided with a vent port 8 which leads to and terminates in an upwardly facing valve seat 9. With the valve seat 9 there coacts a vent valve 11, which is guided by a shouldered stem 12 slidably mounted in a housing 13 screwed into the body 5. A coil spring 14 surrounding the stem 12 and seated against a portion of the housing 13 and a flange on the rod 12, urges the valve 11 in a direction to seal against the seat 9. Just above the valve 11 the rod 12 is provided with an annular flange 15. The passage 8 leads to a seat bushing 16 against which seats a check valve 17. The check valve 17 is guided by a sleeve 18 which is slidably mounted in a cap 19 threaded into a portion of the housing 5. Cap 19 is vented at 21 and houses a coil spring 22 which serves to urge the valve 17 in a closing direction with sufficient force to yield under pressure in the chamber 8 of approximately ten pounds per square inch. Air discharging past the valve 17 flows to atmosphere through a passage 23.

Bolted to the lower face of the housing 5 is a hollow body 24 which makes a tight joint with the housing 5 by means of an intervening gasket 25. The housing 5 is formed with a port 26 which registers with the port 3 and which is formed adjacent the gasket 25 with a recess to receive a choke plug 27 which fits tightly in the recess and serves to fix the effective area of the port 26.

Formed in the body 24 is a reservoir 28 and between this reservoir and the projection in which the port 8 is formed, there is an annular cylinder bushing 29 having at its lower end the annular upwardly projecting sealing rim 31. Slidably mounted in the bushing 29 is a piston 32 having a downwardly extending stem 33 which is guided for axial movement in a bushing 34 supported in an upwardly extending boss 35. The space below the stem 33 is vented at 36 to the interior of the reservoir 28. Clamped to the lower side of the piston 32 by means of nuts 37 is an annular disk 38 which confines a gasket 39 so dimensioned as to seat against the rim 31 in the lowermost position of the piston 32. The piston 32 is provided with a sealing ring 41 which is sufficient to prevent ordinary leakage, the purpose of the gasket 39 being to insure an absolutely tight seal when the piston 32 is in its lowermost position. The stem 33 of the piston is formed with an axial bore 42 leading from the space above the piston and terminating in an annular groove 43, which in the lowermost position of the piston is slightly below the upper end of the bushing 34. The clearance between the stem 33 and the bushing 34 is too minute to illustrate in the drawing, but is sufficient to permit charging of the reservoir 28 by way of the port 42 at the proper rate. This rate should be restricted to avoid tendency to overcharge the reservoir 28 on cars near the forward end of the train. As the device wears the clearance is likely to increase, with the resulting tendency for such overcharge to occur, and as such overcharge would cause undesired emergency applications, at the time when the engineer moves his brake valve to running position, some means must be provided to dissipate the overcharge as fast as it occurs. For this purpose an outwardly opening check valve 44 is provided, normally held sealed by a light spring 45 and controlling outflow from the reservoir 28 to a port 46 formed in the body 24 and leading to the choke 27 and thence to the port 26. The effect is to dissipate the overcharge in the reservoir 28 by venting it to the auxiliary reservoir, which when used with a triple valve having the usual restricted recharge function is protected partially at least from overcharge.

In service position of the piston 32 it is arrested by the pins 47 which engage the flange 15 on the valve 9 without opening that valve. If brake pipe pressure is being reduced at a service rate, the resistance of the spring 14 will be sufficient to arrest the piston 32 in this position with the valve 9 closed and the port 42, which then clears the bushing 34, will be adequate to vent the reservoir 28 to the brake pipe rapidly enough to enable reservoir pressure to fall practically concurrently with brake pipe pressure. Upon a more sudden and severe reduction of brake pipe pressure, piston 32 will move to its upward limit of motion unseating the valve 11 and directly venting the brake pipe to atmosphere through the valve 17. The port 42 is inadequate to vent the chamber 28 at such a rapid rate, and it and the total volume of the chamber 28 are so proportioned that the valve 11 will be held open long enough to insure the necessary emergency reduction of brake pipe pressure.

The mechanism so far described is in its main aspect identical with that now in common use, and is chosen as typical of that general class of automatic vent valves in which a piston balanced between brake pipe and reservoir pressure is moved by preponderating reservoir pressure to produce an application.

The parts now to be described embody the particular inventive features of the present application.

Leading from the reservoir 28 is a port 48 which leads through a valve seat bushing 49 to the interior of a secondary reservoir 51. Coacting with the seat on valve bushing 49 is a check valve 52 which is urged to its seat by a light spring 53, the valve and its spring being so dimensioned that when fully charged the pressure in the reservoir 51 will be only slightly less than that in the reservoir 28.

Fixed to the valve 52 is a stem 54 which has guiding wings or vanes 55 formed upon it where it passes through the bushing 49. The stem 54 is further provided with an enlarged cylindrical portion 56 which makes a practically fluid tight sliding joint with a bushing 57 mounted in the body 24. The stem 54 projects through the bushing 57 into a chamber 58 to which leads a port 59 in communication with the brake pipe port 6. Port 59 is wholly out of communication with the port 48 and the chamber 58 is beneath the open annular lower end of a cylinder bushing 61 which has at its lower end an upwardly extending sealing rim 62. Mounted in the bushing 61 is a cup shaped piston or plunger 63 open at its upper end. At its lower end it is in thrust relation with the stem 54 and is provided with an annular gasket 64 which in the lower position of the piston 63 seals against the annular rim 62 on bushing 61. The upper end of the piston 63 is reduced and externally grooved, as shown at 65, so as to have a relatively reduced sealing area with a gasket 66 when the piston 63 is in its uppermost position. The gasket 66 is sealed in place by threaded plug 67 having an axial vent port 68. The plug 67 is locked in place by a threaded cap 69 which has lateral vent ports 71, serving as continuations of the axial vent port 68. A spring 72 is interposed between the plug 67 and the piston 63 in such manner as to urge the piston downward and the strength of the spring 72 is such that it will be overpowered by a moderate brake pipe pressure, say twenty pounds per square inch. The annular space surrounding the sealing rim 62 at the lower end of the cylinder bushing 61 is connected by a port 73 with the upper end of the cylinder space and particularly with the annular groove at 65.

The valve is shown in the drawing in the uncharged position. As brake pipe pressure rises piston 32 will be forced to its lowermost position and air will flow through the passage 42, groove 43, the clearance between the stem 33 and the bushing 34, to the reservoir 28. This air will also flow through the passage 48 to the reservoir 51. This will continue until brake pipe pressure reaches a value of say twenty pounds at which spring 72 is overpowered. At such time piston 63 will move upwardly and seat on gasket 66 and the spring 53 will close valve 52 until a slight excess pressure is built up in reservoir 28, say about two pounds per square inch, at which time valve 52 will again open, permitting continued charging of reservoir 51. Thus the reservoirs 28 and 51 will be charged to approximately equal pressures. Should reservoir 28 be overcharged the check valve 44 will relieve the overcharge, allowing it to pass to the auxiliary reservoir.

On ordinary service reductions of brake pipe pressure, piston 32 will move up and the reservoir vent port 42 will bleed pressure from the reservoir 28, allowing its pressure to follow brake pipe pressure. At such time valve 52 is closed and the charge in reservoir 51 is retained. Upon an emergency reduction of brake pipe pressure the piston 32 will move far enough to unseat the valve 11, venting the brake pipe to atmosphere and causing the triple valve to perform its emergency functions.

In case of a frozen brake pipe or accidentally closed angle cock, as above mentioned the leakage from the brake pipe would produce a gradual depletion of pressure in the system. This will ultimately result in such reduction in pressure in the chamber 58 that piston 63 starts to move downward. As soon as such motion starts the port 73 will allow brake pipe pressure to enter above piston 63 and substantially equalize the fluid pressures above and below this piston. Since the spring 72 was sufficient to start motion with unequalized pressure, the effect of such equalization is to permit the spring 72 to move the piston 63 suddenly to its lowermost position where the gasket 64 seals on the seat 62, while the piston by collision with the stem 54 unseats the valve 52. The charge in the reservoir 51 at approximately normal brake pipe pressure discharges through the port 48 into the reservoir 28, and immediately forces piston 32 up overcoming the resistance of the partially depleted brake pipe pressure and opening the valve 11. This immediately vents the brake pipe to atmosphere and produces an emergency function of the unrelated triple valve.

While I prefer the construction shown, various modifications are possible. The air, which in the embodiment shown, is supplied by the reservoir 51, might be taken from any available source. It is immaterial whether the reservoir 51 be charged directly from the reservoir 28 or by some other means. It is convenient, but not essential, that a single check valve 52 which normally prevents back flow from the reservoir 51 to the reservoir 28 be used also as the means for permitting such back flow on occasion. The port 73, useful because of its accelerating function, may be dispensed with, and the pressure responsive mechanism consisting essentially of the piston 63 and its spring 72 may take a wide variety of forms. Moreover other vent valve mechanisms of this general character are known, and the invention is susceptible of use with them. Indeed, as suggested it is susceptible of general use with automatic valves characterized by the presence of a piston balanced between brake pipe and reservoir pressure and moving to perform some brake applying function when reservoir pressure predominates. Consequently in the particulars suggested as well as in other details which will readily suggest themselves to those skilled in the art, modification is recognized as possible and in particular cases such modified structures may be preferred to the embodiment illustrated.

What is claimed is,—

1. The combination with an automatic valve of the type in which a piston balanced between brake pipe and reservoir pressures controls charging of the reservoir and moves under predominant reservoir pressure to a functionally active position, of means for assuring motion of said piston to such position upon gradual depletion of pressure in the system and comprising a device subject to control by brake pipe pressure and serving to admit air at approximately the normal brake pipe pressure to said reservoir upon depletion of brake pipe pressure to a chosen low value.

2. The combination with an automatic valve of the type in which a piston balanced between brake pipe and reservoir pressures controls charging of the reservoir and moves under predominant reservoir pressure to a functionally active position; of means for assuring motion of said piston to such position upon gradual depletion of pressure in the system, which comprises a secondary reservoir; means for charging the same; and means subject to control by brake pipe pressure, normally preventing flow from the secondary reservoir to the first named reservoir but conditioned upon the depletion of brake pipe pressure to a chosen value to permit such flow.

3. The combination with an automatic valve of the type in which a piston balanced between brake pipe and reservoir pressures controls charging of the reservoir and moves under predominant reservoir pressure to a functionally active position; of means for assuring motion of said piston to such position upon gradual depletion of pressure in the system, which comprises a secondary reservoir; means including a check valve for charging the secondary reservoir from the first named reservoir and preventing back flow; and means subject to brake pipe pressure and rendered effective by the depletion thereof to a chosen low value to permit flow from the secondary to the first named reservoir.

4. The combination with an automatic valve of the type in which a piston balanced between brake pipe and reservoir pressures controls charging of the reservoir and moves under predominant reservoir pressure to a functionally active position; of means for assuring motion of said piston to such position upon gradual depletion of pressure in the system, which comprises a secondary reservoir; a check valve arranged to permit flow from the first named reservoir to the secondary reservoir and to close against back-flow; and means subject to brake pipe pressure and rendered effective by the depletion thereof to a chosen low value to unseat said check valve.

5. The combination with an automatic valve of the type in which a piston balanced between brake pipe and reservoir pressures controls charging of the reservoir and moves under predominant reservoir pressure to a functionally active position; of means for assuring motion of said piston to such position upon gradual depletion of pressure in the system, which comprises a secondary reservoir; a check valve arranged to permit flow from the first named reservoir to the secondary reservoir and to close against back-flow; a second piston in thrust relation with said check valve subject to brake pipe pressure and urged thereby in a direction to permit said valve to seat; and resilient means constantly urging said second piston in a valve-opening direction.

6. The combination with an automatic valve of the type in which a piston balanced between brake pipe and reservoir pressures controls charging of the reservoir and moves under predominant reservoir pressure to a functionally active position; of means for assuring motion of said piston to such position upon gradual depletion of pressure in the system; which comprises a secondary reservoir; a check valve arranged to permit flow from the first named reservoir to the secondary reservoir and to close against back flow; a second piston in thrust relation with said check valve, subject to brake pipe pressure and urged thereby in a direction to permit said valve to seat; resilient means constantly urging said second piston in a valve opening direction; and means including a by-pass port and port sealing gaskets against which said second piston seats in its limiting positions, for substantially equalizing the fluid pressures on the two ends of the second piston as the latter moves in valve opening direction.

7. The combination with a brake pipe vent valve of the type in which a piston balanced between brake pipe and reservoir pressures controls charging of the reservoir, moves under slightly predominant reservoir pressure to a position in which the reservoir is vented at a service rate, and moves under a more heavily predominant reservoir pressure to a position in which the brake pipe is vented rapidly to produce an emergency application, of means for ensuring an emergency application upon gradual depletion of pressure in the system comprising a device subject to control by brake pipe pressure and serving to admit air at approximately the normal brake pipe pressure to said reservoir upon depletion of brake pipe pressure to a chosen low value.

8. The combination with a brake pipe vent valve of the type in which a piston balanced between brake pipe and reservoir pressures controls charging of the reservoir, moves under slightly predominating reservoir pressure to a position in which the reservoir is vented at a service rate, and moves under a more heavily predominating reservoir pressure to a position in which the brake pipe is vented rapidly to produce an emergency application; of means for ensuring an emergency application upon gradual depletion of pressure in the system, which comprises a secondary reservoir; means for charging the same; and means subject to control by brake-pipe pressure, normally preventing flow from the secondary reservoir to the first named reservoir but conditioned upon the depletion of brake pipe pressure to a chosen value to permit such flow.

9. The combination with a brake pipe vent valve of the type in which a piston balanced between brake pipe and reservoir pressures controls charging of the reservoir, moves under slightly predominating reservoir pressure to a position in which the reservoir is vented at a service rate, and moves under a more heavily predominating reservoir pressure to a position in which the brake pipe is vented rapidly to produce an emergency application; of means for ensuring an emergency application upon gradual depletion of pressure in the system, which comprises a secondary reservoir; means including a check valve for charging the secondary reservoir from the first named reservoir and preventing back flow; and means subject to brake pipe pressure and rendered effective by the depletion thereof to a chosen low value to permit flow from the secondary to the first named reservoir.

10. The combination with a brake pipe vent valve of the type in which a piston balanced between brake pipe and reservoir pressures controls charging of the reservoir, moves under slightly predominating reservoir pressure to a position in which the reservoir is vented at a service rate, and moves under a more heavily predominating reservoir pressure to a position in which the brake pipe is vented rapidly to produce an emergency application; of means for ensuring an emergency application upon gradual depletion of pressure in the system, which comprises a secondary reservoir; a check valve arranged to permit flow from the first named reservoir to the secondary reservoir and to close against back-flow; and means subject to brake pipe pressure and rendered effective by the depletion thereof to a chosen low value to unseat said check valve.

11. The combination with a brake pipe vent valve of the type in which a piston balanced between brake pipe and reservoir pressures controls charging of the reservoir, moves under slightly predominating reservoir pressure to a position in which the reservoir is vented at a service rate, and moves under a more heavily predominating reservoir pressure to a position in which the brake pipe is vented rapidly to produce an emergency application; of means for ensuring an emergency application upon gradual depletion of pressure in the system, which comprises a secondary reservoir; a check valve arranged to permit flow from the first named reservoir to the secondary reservoir and to close against back flow; a second piston in thrust relation with said check valve subject to brake pipe pressure and urged thereby in a direction to permit said valve to seat; and resilient means constantly urging said second piston in a valve-opening direction.

12. The combination with a brake pipe vent valve of the type in which a piston balanced between brake pipe and reservoir pressures controls charging of the reservoir, moves under slightly predominating reservoir pressure to a position in which the reservoir is vented at a service rate, and moves under a more heavily predominating reservoir pressure to a position in which the brake pipe is vented rapidly to produce an emergency application; of means for ensuring an emergency application upon gradual depletion of pressure in the system, which comprises a secondary reservoir; a check valve arranged to permit flow from the first named reservoir to the secondary reservoir and to close against back flow; a second piston in thrust relation with said check valve, subject to brake pipe pressure and urged thereby in a direction to permit said valve to seat; resilient means constantly urging said second piston in a valve opening direction; and means including a by-pass port and port sealing gaskets against which said second piston seats in its limiting positions, for substantially equalizing the fluid pressures on the two ends of the second piston as the latter moves in valve opening direction.

13. In an emergency brake pipe vent, the combination of a casing having a brake pipe connection; a brake pipe vent valve; a spring urging said valve closed; a reservoir; a piston interposed between said connection and reservoir and having a charging position at its limit of motion toward the reservoir, an emergency position at its opposite limit of motion in which it holds said vent valve open, and an intermediate service position in which it may engage, without opening the vent valve; valve means controlled by said piston arranged to offer a restricted charging passage from brake pipe to reservoir in charging position and a bleed passage from reservoir to brake pipe in the other positions, the capacity of such passage being such as to premit reservoir pressure to reduce only at a service rate; a secondary reservoir whose volume is so related to the capacity of the said bleed passage and the strength of the vent valve spring as to overpower said spring for a substantial period while said secondary reservoir is being vented through said bleed port; means for charging said secondary reservoir; and means subject to control by brake pipe pressure normally preventing flow from the secondary reservoir to the first named reservoir but conditioned upon the depletion of brake pipe pressure to a chosen value to permit such flow.

In testimony whereof I have signed my name to this specification.

CHARLES A. CAMPBELL.